United States Patent [19]
Von Seebach et al.

[11] Patent Number: 5,365,866
[45] Date of Patent: Nov. 22, 1994

[54] METHOD AND APPARATUS FOR TREATING EXHAUST GASES FROM PREHEATER AND PREHEATER/PRECALCINER KILNS BURNING HAZARDOUS WASTE FUELS

[75] Inventors: H. Michael Von Seebach; Charles W. Lamb; F. MacGregor Miller, all of Houston, Tex.

[73] Assignee: Southdown, Inc., Houston, Tex.

[21] Appl. No.: 986,759

[22] Filed: Dec. 8, 1992

[51] Int. Cl.⁵ .......................... C04B 7/02; A47J 36/00
[52] U.S. Cl. .................................. 110/345; 110/259; 432/106
[58] Field of Search ............... 110/345, 203, 211, 216, 110/245, 246, 255, 259; 588/228; 432/106

[56] References Cited

U.S. PATENT DOCUMENTS

| | | | |
|---|---|---|---|
| 3,267,890 | 8/1966 | Zinn et al. | 110/216 |
| 3,784,389 | 1/1974 | Hastrup | 432/106 |
| 3,884,162 | 5/1975 | Schuster | 110/216 |
| 4,788,918 | 12/1988 | Keller | 110/215 |
| 4,821,653 | 4/1989 | Jones | 110/229 |
| 4,850,290 | 7/1989 | Benoit et al. | 110/346 |
| 4,958,578 | 9/1990 | Houser | 110/246 |
| 5,207,176 | 5/1993 | Morhard et al. | 110/246 |

*Primary Examiner*—Henry A. Bennett
*Assistant Examiner*—William C. Doerrler
*Attorney, Agent, or Firm*—Deveau, Colton & Marquis

[57] ABSTRACT

A method and apparatus for treating the exhaust gases of a combustion process, the exhaust gases comprising in part condensable or solidifiable particulate matter and residual hazardous organic compounds and emanating from the combustion process at a first temperature, by heating a portion of the exhaust gases using a heating means within a bypass means to a second temperature higher than the first temperature, maintaining the heated exhaust gases within the bypass means at the second temperature for a time sufficient to render the desired poriton of the residual hazardous organic compounds harmless, and then cooling the heated exhaust gases using a quench means within the bypass means to a third temperature lower than the first temperature in a period of time short enough to prevent the condensable or solidifiable particulate matter from condensing or solidifying on and adhering to the bypass means.

23 Claims, 2 Drawing Sheets

METHOD AND APPARATUS FOR TREATING EXHAUST GASES FROM PREHEATER AND PREHEATER/PRECALCINER KILNS BURNING HAZARDOUS WASTE FUELS

BACKGROUND OF THE INVENTION

1. Field of the Invention

This invention is related generally to a method and apparatus for thermally treating the exhaust gases of a combustion process by reheating the exhaust gases so as to destroy any residual hazardous compounds contained in the exhaust gases, and then to cool the reheated exhaust gases to reduce the stickiness of particles contained in the exhaust gases. This invention is related specifically to a lengthened and/or enlarged bypass arrangement coupled to a hazardous waste-fueled rotary cement kiln, the bypass comprising one or more chambers which may include afterburners to treat, often by reheating the exhaust gases so as to destroy organic compounds contained in the exhaust gases from the cement kiln and a quench means for cooling the bypassed exhaust gases to prevent particles contained in the bypassed exhaust gases from condensing and/or solidifying on and sticking to the walls of the apparatus.

2. Prior Art

Hazardous waste incinerators use afterburners in special swirl chambers to reheat the incinerator exhaust gases to a minimum of 1800° F. with a retention time of at least two seconds. These swirl chamber arrangements with an afterburner generally are regarded as sufficient to guarantee a minimum of 99.99% destruction efficiency of organic compounds. For example, see Brunner D. R., *Handbook of Hazardous Waste Incineration*, TAB Professional and Reference Books, Blue Ridge Summit, Pa., 1986.

In all cement kilns, fuel is burned at the hot, discharge end of the kiln. This fuel may consist of coal, oil, or natural gas, or it may include petroleum coke, tires, and hazardous waste fuel as well. In addition, in cement kilns burning hazardous waste fuel, the solid hazardous waste fuel is metered typically in discrete increments into the rotary kiln. In U.S. Pat. No. 3,572,524 to Muckenheim, an apparatus for charging sludges and other similar waste materials to a rotary incinerating kiln is disclosed which charges the waste to the feed end of the kiln. In U.S. Pat. No. 4,850,290 to Benoit et al., a method for charging drums of solid hazardous waste directly into the central portion of a rotary kiln is disclosed. No matter how the waste fuel is charged to the kiln, any fuels, such as discarded tires, and most specifically hazardous waste fuels, can contain organic compounds a portion of which, when incinerated, may be released incompletely combusted in the exhaust gases from the kiln.

For preheater kilns, the feed end of a rotary kiln is the transition between the preheater, or the preheater with precalciner, and the rotary kiln. In these kilns, it is the locale typically used for firing supplemental fuel other than that fired at the hot or discharge end of the kiln. Due to the fact that the raw material kiln feed and any fossil fuel used contain alkali metal (sodium and potassium) compounds, and the hazardous waste fuels typically contain considerable amounts of chlorides and other inorganic materials, the potential exists for the formation of low-melting alkali chloride salts. These salts have the potential to cause the formation of buildups on the exhaust gas ductwork and plug the system. Therefore, most preheater and precalciner kilns in the United States have been equipped with a bypass system to extract some of these sticky alkali chloride/alkali sulfate salts and reduce their concentration in the exhaust gas stream, thereby minimizing the likelihood of the buildups.

Conventional bypasses typically extract 10% or more of the rotary kiln exhaust gases from the riser duct prior to the entry point of the preheated raw meal from the second-lowest preheater stage. The amount of bypass gases extracted from the system depends upon the amount of chlorine, alkali, and sulfate which need to be removed from the pyroprocessing system in order to ensure steady state operations. It is known that chlorides, alkalis and sulfates, unless they are being removed directly from the pyroprocessing system, tend to form buildup in the lower part of the preheater, the riser duct, and in the feed end housing. These buildups occur because the alkali chloride and sulfate vapors and liquid droplets traveling with the hot exhaust gases from the kiln are cooled down by the cooler raw meal particles fed to the kiln, or by the lower temperature refractory walls.

The formation of buildup of alkali chlorides and sulfates also can occur in the bypass takeoff arrangement, as well as in the bypass duct between the takeoff and the bypass quench chamber. The bypass quench chamber serves to cool rapidly the hot kiln gases containing alkali chlorides and sulfates with ambient air, and to condense and solidify these vapors and liquids while they are freely suspended in the gas stream so that they do not stick to the walls and initiate buildups. Typical bypass designs minimize the length of the duct between the bypass takeoff and quench chamber in an effort to minimize the areas on which buildup can occur. This is exemplified in U.S. Pat. No. 3,784,389 to Hastrup. As a result, the retention time of the bypass gases for transport from the kiln riser duct to the quench chamber is rather short. For applications in which a short bypass is sufficient, such short bypasses may reduce the quantity of material condensing and building up on the walls of the apparatus.

Although shorter bypasses may help prevent some buildup of scale on the walls of the apparatus, such a structure is not suitable when the kiln itself does not achieve an adequate degree of destruction of hazardous constituents, such as principal organic hazardous compounds (POHCs). Shortened bypasses may not allow sufficient time for destruction or conversion of such hazardous compounds into innocuous combustion products. Gas temperature and gas retention time are known to be the most important factors for a substantially total destruction of hazardous compounds such as the organic compounds remaining in the exhaust gases produced when hazardous wastes, or any other fuels, are used in combustion apparatuses. These two parameters are especially critical, of course, when hazardous wastes are fed to the feed end of the rotary kiln.

For the kiln exhaust gases that are not extracted by the bypass, the gas residence time at elevated temperatures is typically in the range of 0.5 to 2 seconds before the gases enter the lowest stage cyclone such that considerable additional destruction of the residual organic compounds in the kiln effluent occurs. Thereafter, as the gases pass upwards through each of the remaining riser ducts and cyclones on their way to the air pollution control device, the temperatures are successively lower and lower, such that very little if any additional combustion of residual products of incomplete combustion (PICs) can occur. In the case of a preheater with precalciner, the gas retention time at elevated temperatures above 1900° F. is even longer, because, from a thermal perspective, the precalciner functions similarly to an afterburner found in hazardous waste incinerators. Thus, for the exhaust gases sent through the preheater and precalciner to the pollution control device, the temperature and residence time may be sufficient to destroy or convert nearly all of the POHCs and PICs.

The temperature at the back end of the rotary kiln, in the area of the bypass takeoff and in the riser duct up to the point that the raw meal from the second lowest preheater stage it; discharged into the riser duct typically is in the range of 1900° F. to 2200° F. However, the gas residence time between the point where the hazardous waste fuels are fled and the bypass takeoff is fairly short, typically on the order of 0.4 seconds. For some POHCs, this temperature and residence time combination is not sufficient to completely destroy POHCs or convert them to harmless combustion products. Thus, current bypasses are inadequate for the destruction of these particular POHCs or PICs.

The two primary goals of current bypass technology are to maintain the kiln at steady state during operation and to quickly cool the exhaust gases so as to prevent particles contained in the exhaust gases from condensing on and solidifying on and sticking to the walls of the apparatus to the extent that operations are hampered. With the growing use of hazardous wastes as a fuel for a rotary kiln, it can be seen that there is a need for new and improved bypass technology for achieving the above two goals, while at the same time allowing for the more complete destruction or conversion of any organics contained in the exhaust gases. It is to this end that the present invention is directed.

BRIEF SUMMARY OF THE INVENTION

As the temperature in the lower stages of the preheater or preheater/precalciner generally is above 1900° F., the gas retention time between the feedpoint of the hazardous waste fuels and the bypass quench chamber is the most critical criterion for preheater and precalciner kilns burning hazardous waste fuels. While a short retention time may help prevent the buildup of scale on the walls of the apparatus, it may not be great enough to adequately destroy certain difficult-to-destroy POHCs or PICs. On the other hand, while a long retention time may help destroy these refractory POHCs and PICs, it may be too great to prevent the buildup of particles or scale on the walls of the apparatus. The purpose of this invention is to modify this critical area to lengthen the gas retention time between the feedpoint of the hazardous waste fuels and the bypass quench chamber, while at the same time including features which help prevent the buildup of particles or scale on the walls of the bypass.

Contrary to present teaching, this invention does not quench the bypass gases as close to the bypass takeoff as possible in order to prevent buildup of particles or scale on the walls of the bypass duct. Instead, this invention reconfigures the bypass and incorporates a means for reheating the exhaust gases to temperatures in excess of 2200° F. as they are extracted by the bypass takeoff, and a means for quickly cooling the exhaust gases to below the particle stickiness stage. The gases are kept at 1900° F. to 2400° F. for approximately one second prior to adding quench air. This reheating, in combination with an increased retention time, ensures the substantially complete destruction of organic substances from the bypass gases of a preheater kiln firing hazardous waste fuels at the back end of the kiln. The subsequent quick cooling deters any particulate contained in the exhaust gases from condensing on and sticking to the walls of the bypass.

Accordingly, it is an object of the present invention to provide a method and apparatus for reheating exhaust gases from a combustion apparatus so as to destroy organic constituents contained therein and then to quickly cool the exhaust gases to prevent buildup of particles contained in the exhaust gases on the walls of the apparatus.

It is another object of the present invention to provide a method and apparatus for treating exhaust gases from a combustion apparatus to remove pollutants therefrom.

A further object of the present invention is to provide a method and apparatus for treating exhaust gases from a rotary cement kiln so as to make the exhaust gases more acceptable for exhaust into the atmosphere.

Still another object of the present invention is to provide a method and apparatus for controlling pollution emanating from a combustion apparatus.

Another object of the present invention is to provide a method and apparatus for reducing pollutants emanating from a cement kiln which is simple in construction, easy to operate, and efficient in operation.

Yet another object of the present invention is to provide a method and apparatus for treating exhaust gases from a combustion apparatus so as to reduce the quantity of buildup of particles or scale on the walls of the apparatus, thus increasing the performance efficiency of the apparatus and reducing the amount of time and labor necessary to clean the apparatus.

These objects, and other objects, features and advantages, of the present invention will become apparent to one skilled in the art when the following detailed description of the preferred embodiments is read in conjunction with the appended figures, in which like references denote like parts throughout several views.

DETAILED DESCRIPTION OF THE PREFERRED EMBODIMENTS

Cement is produced by preparing the necessary raw materials in the necessary proportions and in the proper physical state of fineness and intimate contact so that chemical conversion can take place at the sintering temperature in the kiln to form the end product, typically referred to as clinker. In general, the materials are roughly crushed, passed through various mixing and sizing apparatuses and then introduced to a kiln. The preferred method for cement production to introduce a dry, powdered material directly to a preheater, then to a rotary kiln which is heated by burning oil, gas, pulverized coal, or other fuel, typically by using the preheated air from cooling the clinker.

The combustion and calcination that must occur to produce the cement clinker results in the generation of exhaust gases which leave the rotary kiln through the feed end. These exhaust gases must be treated to prevent the particles entrained in the exhaust gases from condensing on and sticking to the walls of the apparatus, and to reduce the concentration of atmospheric pollutants such that the exhaust gases may be discharged to the atmosphere. Typically, air pollution control equipment such as bag houses or electrostatic precipitators are used.

Figure 2:
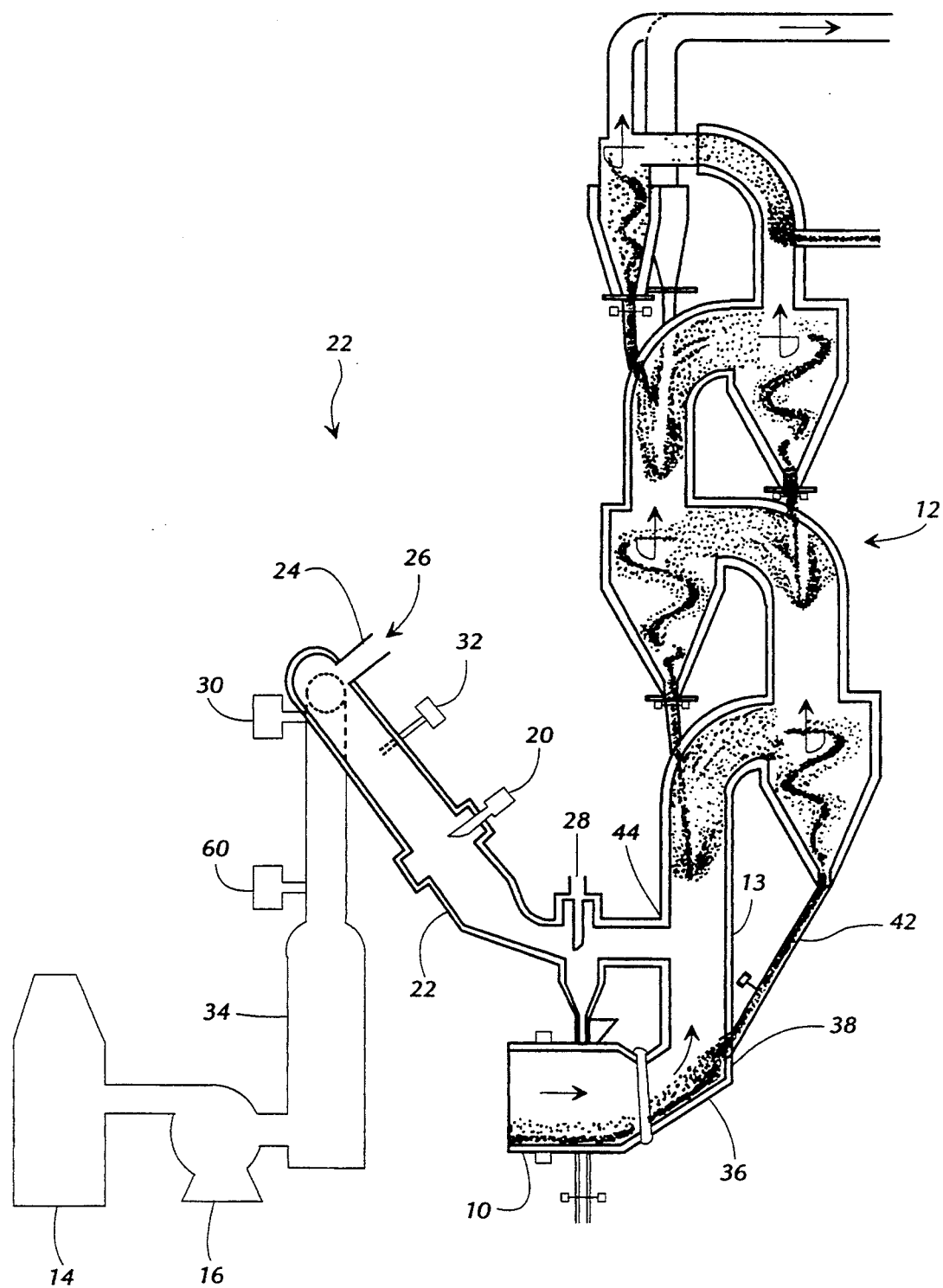
FIG. 2 is a schematic of a preferred embodiment of the apparatus of the present invention which operates substantially in accordance with the method shown in FIG. 1.

More recently, various additional components have been inserted between the feed end of the kiln and the air pollution control device so as to improve fuel efficiency and to reduce the quantity of pollutants even further. As shown in FIG. 2, suspension preheater 12 and air pollution control device 14 are known in the art. The exhaust gases from kiln 10 pass through feed end housing 36 and enter preheater 12 where they are cooled by countercurrent heat transfer with the incoming raw meal. In each successive cyclone/riser duct combination, a heat exchange step occurs, with the exhaust gases becoming progressively cooler and the raw meal progressively warmer. The exhaust gases from the preheater 12 pass to the air pollution control device 14 by a device such as a fan 16. Optionally, the exhaust gases from the preheater may be subjected to an air quench, such as a swirl chamber and/or a water quench (not shown) such as a water spray tower both to further cool the exhaust gases and to remove additional potential pollutants from the exhaust gases.

Still more recently, hazardous wastes have been used as a supplemental fuel to help create the sintering temperature within the kiln. Although there is substantial evidence that hazardous waste fuel actually burns cleaner than does coal, for example, the public perception is that combustion may result in byproducts or unburned residual PICs which in and of themselves can have a negative effect on human health and the environment. One method which has been employed for destroying (or converting to non-hazardous compounds) the organic PICs contained in the exhaust gases is by reheating the exhaust gases to a temperature and for a duration that will accomplish the destruction of these organic compounds. Such reheating can be accomplished using an afterburner. Therefore, even more recently, afterburners (not shown) have been added, for example, to the exhaust duct from the preheater 12 to help destroy the organic compounds contained in the exhaust gases before the exhaust gases are introduced to the air pollution control device 14.

The typical steady-state bypass takes off from about 10% to 20% of the exhaust gases exiting the feed end of the kiln before the remainder of the exhaust gases enter preheater 12. The prior art quenched these exhaust gases within two feet of the feed end of the kiln to cool the exhaust gases. The entrained particulate matter typically is warm and has a certain inherent stickiness which tends to cause it to stick to the bypass walls. The purpose of quenching the exhaust gases with air is to cool the sticky particulate to well below their freezing points to eliminate the sticky tendencies. In the current bypass technology, the exhaust gases neither are heated high enough to ensure destruction of the organic compounds, nor are cooled enough to minimize buildup of the sticky particles on the feed end housing 36 and bypass 11 walls.

Figure 1:
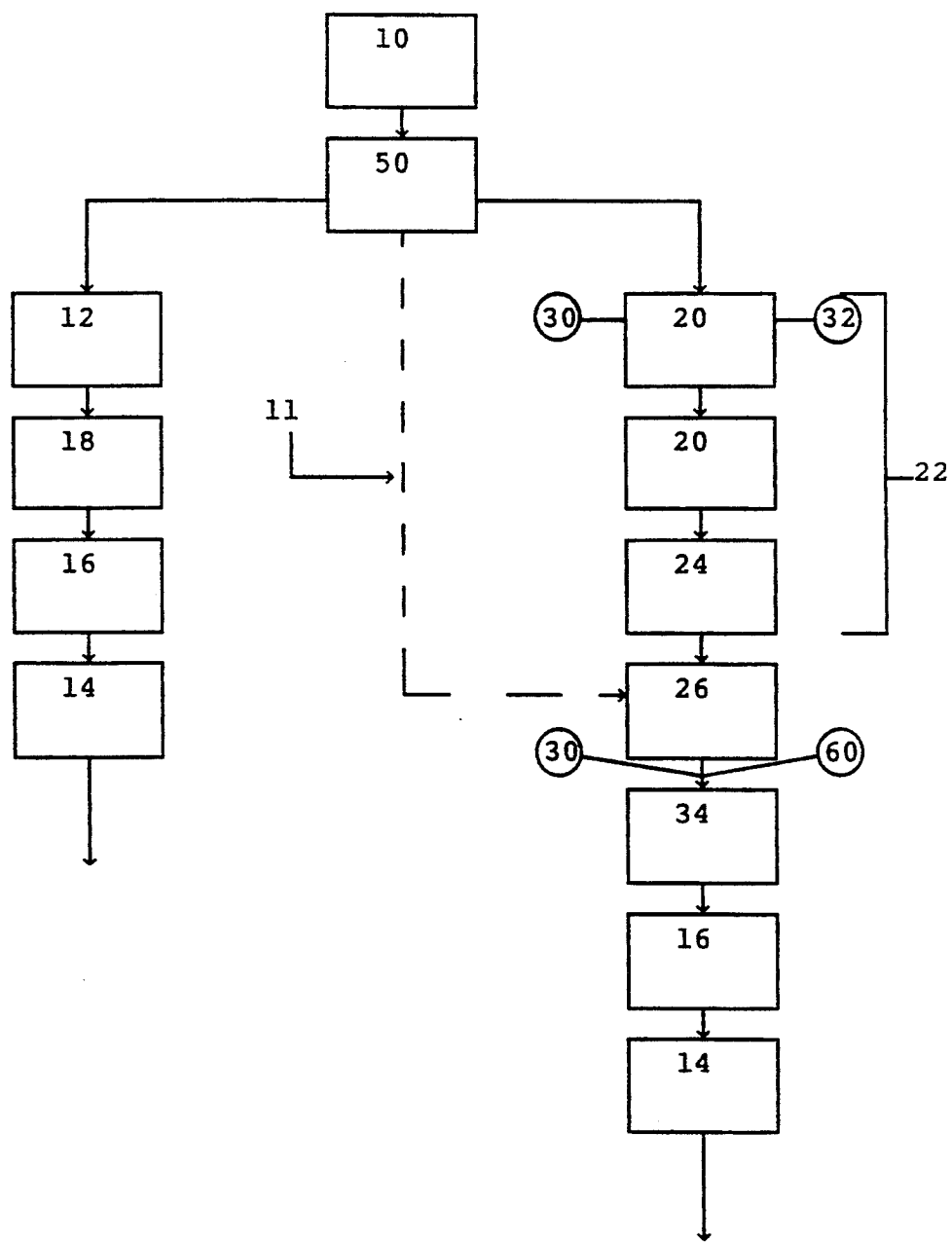
FIG. 1 is a schematic of a preferred embodiment of the method of the present invention.

With reference now to FIG. 1, a flow chart of the preferred method for carrying out the present invention is shown. Although this method can be used in conjunction with any combustion apparatus, the preferred embodiment is for use in conjunction with a cement kiln, and more particularly a rotary cement kiln. The method of the present invention is a new way of treating the bypass gases to remove the stickiness from the particles in the exhaust gases and to destroy the organic compounds contained in the exhaust gases.

As shown in FIG. 1, in the prior art the exhaust gases taken directly from tile combustion step 10 are split in a diversion step 50, wherein a portion of the exhaust gases are sent through the preheater step 12 to the pollution control step 14, and a portion of the exhaust gases are bypassed 11 in order to maintain stable operating conditions during the combustion step 10 in the combustion apparatus. During the preheater step 12, the exhaust gases from the preheater may be subjected to a quench step 18 to reduce the temperature of the exhaust gases before introduction to the pollution control device and step 14.

In the present invention, the portion of the exhaust gases not sent to preheater step 12 is sent to treatment bypass step 22. Typically from 10% to 100% of the exhaust gases are sent to treatment bypass step 22. In bypass 22, the exhaust gases are heated to or maintained at a certain temperature for a certain period of time in a reheating step 20 to help destroy or convert a greater portion of the hazardous unburned components of the exhaust gases, such as POHCs, PICs, and other organic compounds. Once the exhaust gases have been subjected to the thermal step, they can be subjected to certain other downstream treatments such as a cool dust condensing step 24, in which cool kiln dust is added to the exhaust gases to act as nucleation sites for any sticky particles remaining, a quenching step 26, such as an air quench, to lower the temperature of the particles to reduce stickiness, and a further quenching step 34, such as a water spray tower, for additional cooling of the exhaust gases and particulate matter. The exhaust gases typically are monitored during the method using such analytical devices as an optical pyrometer or thermocouple 30 and an oxygen analyzer 32.

As in conventional exhaust gas treatment methods, once the exhaust gases have been treated as discussed above, they are directed to an air pollution control step 14 by a mass flow step 16, such as a fan. During the air pollution control step 14, articulate matter contained in the exhaust gases is removed and cleaned exhaust is then released to the atmosphere. The particulate matter then can be removed for disposal or further use.

The method of the present invention, during the exhaust gas treatment steps 20,28,24,26,34 the treatment bypass step 22, allows for the exhaust gases to be treated in an added pre-quench volume both with and without extra heat and with and without extra oxygen. By increasing either the temperature of the exhaust gases for a predetermined time period or, as in the preferred embodiment, by increasing the residence time of the exhaust gases in the treatment bypass step 22 at the available temperature, the organic impurities contained in the exhaust gases can be destroyed with greater efficiency and to a greater extent.

Using current bypass technology, the residence time of the exhaust gases within the bypass step typically is on the order of 0.1 to 0.3 seconds. The exhaust gases in the prior art are cooled in a quenching step 26, typically by an air quench device, in that amount of time and then sent to the air pollution control step 14. The present method reheats the exhaust gases to a temperature higher than that typically found in the feed end of the kiln, and maintains the exhaust gases at that reheated temperature for over 0.01 seconds, generally for between about 0.01 to 5.0 seconds, and preferably for between about 0.1 to 2.5 seconds. The temperature of the exhaust gases leaving the gas discharge end of combustion step 10 typically is on the order of 850° to 1150° C. During the reheating step 20, the exhaust gases are reheated to a temperature of over about 900° C., generally to between about 900° C. to 1600° C., and preferably to between about 950° C. to 1250° C., and even higher if required. The temperature to which the exhaust gases are raised is dependent on the residence time of the exhaust gases in the bypass 22.

EXAMPLE I

A bypass chamber for destroying residual tetrachloroethylene is a useful example. Tetrachloroethylene is a principal organic hazardous compound (POHC) with high thermal stability, and is a typical organic component of hazardous waste which needs to be destroyed. Relative to most other POHC's, tetrachloroethylene requires a relatively long residence time at temperature for destruction. The time required to obtain 99.99% destruction of tetrachloroethylene is given by the following expression:

$$\Theta = - \frac{\ln(0.0001)}{2.6 \times 10^6 e^{-33,000/1.987 T}}$$

Where:
$\Theta$ = seconds of residence time
T = temperature in K

The residence time for 99.99% destruction of the tetrachloroethylene at various temperatures is shown in Table 1.

TABLE 1

| Temperature | | | Seconds For 99.99% Destruction | |
|---|---|---|---|---|
| °C. | °F. | °K. | Theoretical | With 2x Safety Factor |
| 1300 | 2372 | 1573 | 0.14 | 0.28 |
| 1200 | 2192 | 1473 | 0.28 | 0.56 |
| 1148 | 2100 | 1421 | 0.42 | 0.84 |
| 1100 | 2012 | 1373 | 0.64 | 1.28 |
| 1000 | 1832 | 1273 | 1.6 | 3.2 |

For a 1–3 second residence time for the exhaust gases in the treatment bypass step 22 in the present invention, the exhaust gases must be raised to a temperature of between about 1000°–1150° C. to destroy or oxidize the POHCs and PICs. As can be determined from Table 1, the temperature to which the exhaust gases are reheated, the volume of the bypass 22, and the residence time in which the exhaust gases are retained in the bypass 22 are interdependent and can be selected for the desired installation. For example, the volume of the bypass 22 is based on the required residence time at the designed temperature for the destruction of the desired organic compound. The temperature and the oxygen level within the bypass step 22 are controlled so as to reduce the wall buildup of the scale by bringing about the controlled solidification of alkalis and chlorides.

The temperature and the oxygen concentration of the reheated exhaust gases can be measured in measurement steps 30,32 with instruments such as an optical or two-color pyrometer, a thermocouple, and an oxygen analyzer. If the temperature of the reheated exhaust gases is too high or too low, particles may be building up on the walls of the bypass. In this event, the system would be adjusted to decrease such buildup. Further, if the oxygen content of the reheated exhaust gases is either too high or too low, the system would be adjusted respectively to decrease or increase the amount of oxygen introduced to the method, so as to increase the efficiency of combustion.

After the exhaust gases have been reheated, they can be further treated in a number of ways. The exhaust gases can be subjected to further reheating, typically by an additional afterburner in a swirl chamber. The exhaust gases can be seeded with cool kiln dust in a cool dust solidifying step 24. The cool kiln dust acts as nucleation sites for deposition of any sticky particles still remaining in the exhaust gases. In this manner, any sticky particles will adhere to the cool kiln dust and be transported with the combustion gases through to the air pollution control step 14, rather than sticking on the system wall. The exhaust gases also can be subjected to a quenching step 26, such as an air quench, to reduce the temperature of the exhaust gases to approximately 600° C. or below. Additional quenching steps may be used to further reduce the temperature of the exhaust gases. The exhaust gases then can be subjected to further quenching steps 34, such as a water spray tower, for further cooling and for removal of particulate matter.

The final temperature of the exhaust gases is variable depending on the particular pollution control step 14 used. Whatever final temperature is acceptable to the pollution control step 14, such as a bag house or electrostatic precipitator, can be achieved using the quenching steps 26,34. Typically, the exhaust gases must be cooled to below 600° C. so that substantially all inorganic species in the exhaust gases are condensed and solidified exiting the quench step 26.

Referring now to FIG. 2, a preferred embodiment of the apparatus for carrying out the above-described method is shown. A typical rotary kiln 10 comprising a feed end housing 36, with a waste fuel feed 38, is shown. Preheated raw meal 42 is introduced to the kiln 10 through a chute into feed end housing 36. Fuels, such as hazardous waste, are introduced to the rotary kiln 10 via the feed line 38 into the feed end housing 36 or directly into the kiln 10. The preheated raw meal is calcined within the kiln 10, then sintered until clinker is produced, which is then removed from the kiln 10 to the clinker cooler (not shown). Gases produced during the calcination and sintering processes rise from the kiln 10 back into the feed end housing 36, and then up riser duct 13. In the prior art, the exhaust gases then are cooled either through heat exchange in the preheater 12, or through an air quench in bypass 11. The cooled bypass exhaust gases are then sent to an air pollution control device 14 using typical gas transport means such as fan 16. Particulate matter is removed by the air pollution control device 14.

In the present apparatus, feed end housing 36 has two exhaust gas exits, preheater 12 and treatment bypass 22. If combustion in the combustion process is very complete and/or if the quantity of sticky particles is not high, the majority, if not all, of the exhaust gases can be passed through preheater 12 to the air pollution control device 14. However, if there are significant concentrations of POHCs or PICs in the exhaust gases and/or there is an amount of sticky particles sufficient to create buildup problems, further treatment of a portion of the exhaust gases may be required.

In the preferred embodiment, hazardous waste fuels are used at least in part to fuel the kiln 10, and the exhaust gases contain condensable constituents, PICs or POHCs, and therefore must be subjected to further treatment. Any amount of the exhaust gases, typically between 10% and 100%, may be diverted into bypass 22 by diverter means 44. Within bypass 22, the exhaust gases are reheated using one or more afterburners 20. Afterburners 20 may be any heat introducing device, such as flames, heat transfer chambers, and any other heat generating means suitable for producing the temperatures required for the present invention. The afterburners 20 produce enough heat to destroy the required portion of the residual hazardous compounds during their residence time in the bypass 22, which is determined by the volume of the bypass 22.

Bypass 22 is enlarged, compared to current bypasses, either in length or in cross-section or both. Enlarging bypass 22 allows a greater residence time sufficient to destroy the hazardous compounds or to convert them to innocuous products. The size of bypass 22 is determined based on the volume of exhaust gases emanating from the kiln 30, the compounds within the exhaust gases which are to be treated, the residence time desired within the bypass 22, and the temperature to which the afterburners 20 are capable of raising the exhaust gases. As shown above in Example I, for 99.99% destruction of tetrachloroethylene using an afterburner temperature of 1100° C., the exhaust gases must be reheated for at least 1.28 seconds within the bypass 22, using a twofold safety factor. Using conventional flow rate equations, one skilled in the art can determine the volume of bypass 22 necessary for proper destruction of the organic compounds.

After the exhaust gases have been reheated to destroy the organic compounds, they must be cooled to reduce the stickiness of any particles remaining in the exhaust gases. This cooling reduces or prevents the tendency for the particles to condense or solidify on and adhere to the walls of the bypass 22, and reduces the temperature of the exhaust gases to a level suitable for introduction to an air pollution control device 14. Several optional process operations may be used for cooling the exhaust gases including a cool dust condensor 24, any of a variety of air quenches 26, such as a swirl chamber, and water spray quench towers 34. Typically, the exhaust gases, during the cooling treatment, are analyzed for temperature, excess oxygen content and unburned hydrocarbons such that the apparatus can be operated at peak efficiency. Optical pyrometer 30, oxygen analyzer 32 and total hydrocarbon analyzer 60 are three such analytical devices which can be used.

Within the preferred cool dust condensor 24, cool kiln dust is introduced to the quench air or exhaust gases. The cool dust acts as nucleation sites for any sticky particles. The sticky particles have a tendency to solidify and stick to the relatively cool walls of the system. By introducing the cool dust to the exhaust gases, less of the sticky particles contained in the exhaust gases will adhere to the wall surfaces of the apparatus and will instead tend to adhere to the cool dust and solidify. The now-coated cool dust is conveyed through the system with the combustion gases to the pollution control devices 14 without sticking to the walls of the apparatus.

The exhaust gases and particulate matter also can be cooled using an air quench 26. The most typical air quench 26 used is a swirl chamber in which ambient air is blown tangentially into a circular chamber into which the exhaust gases are introduced. The swirling lower-temperature ambient creates turbulence and mixes with the exhaust gases. Through conventional heat exchange between the cooler ambient air and the warmer exhaust gases and particles, the exhaust gases and particles are cooled. The dust condenser 24 may be combined with the air quench 26.

The exhaust gases containing particulate matter also can be introduced to a water spray quench tower 34 using water which is cooler than the exhaust gases containing particles. Evaporative cooling of the gases, together with conventional transfer of sensible heat between the water and the exhaust gases will cool the exhaust gases together with their entrained particulate load. Further, some of the particles will be separated from the gas stream with the use of the water spray.

After the exhaust gases with their entrained particulate matter have been cooled to a suitable temperature, typically below about 600° C., the exhaust gases are introduced to an air pollution control device 14 by way of conventional transport means, such as fan 16. The air pollution control device can be any of the typical air pollution control devices, such as electrostatic filters and bag houses (fabric filters). Within these air pollution control devices 14, the exhaust gases are further treated to remove any remaining particulate matter, such that the cleaned gases can be released to the atmosphere.

With regard to the typical cement kiln 10 system, in order to increase the gas retention time of the bypass gases between the takeoff and the quench chamber, the gas duct between the two arrangements needs to be enlarged. This, however, will lead to cooling of the hot gases due to radiation and convective heat transfer from the duct and, consequently, often will lead to considerable buildup in the duct. The invention, therefore, consists in part of reheating the gases with an auxiliary afterburner 20 immediately after the bypass takeoff to a temperature that is sufficient to minimize buildup in the enlarged duct between the bypass takeoff and the quench chamber. Furthermore, in addition to increasing the retention time, a swirl or vortex chamber may be provided with a downward-oriented afterburner 28, in the embodiment shown in FIG. 2, for reheating the bypass gases. Downstream from the swirl or vortex chamber 36 with downward-oriented afterburner 28, a gas duct is provided with sufficient length and volume to effect the desired gas retention time prior to the gases entering a conventional quench air chamber, cool dust condenser or any other quench step.

A typical kiln 10 feed end housing 38 with riser ducts 13 and bypass 22 takeoff is shown in FIG. 2, which shows, in principle, the location of the auxiliary afterburner 20 to reheat the bypass gases. FIG. 2 also shows, in principle, the swirl or vortex chamber 21 with the auxiliary afterburner 28 location and its downward direction. Following the swirl or vortex chamber 21 is an air quench 26 which should be located a sufficient distance from the bypass 22 takeoff from the feed end housing 36 so as to provide a bypass 22 of sufficient volume to ensure gas retention times in the bypass 22 in excess of 0.5 seconds of 1200° C. or equivalent thermal severity.

In this manner, a method and apparatus for the further destruction of organic compounds remaining from a cement manufacturing kiln using a hazardous waste fuel supply and a method and apparatus for reducing the amount of particulate matter buildup on the apparatus wall surfaces is provided. The present method and apparatus increases gas residence time and/or adds heat to the exhaust gases in the bypass prior to quenching, or both, to achieve the objects discussed above, rather than immediately quenching the exhaust gases from a kiln and then sending them to air pollution control devices. The above detailed description of preferred embodiments is for illustrative purposes only and is not meant to limit the spirit and scope of the invention and its equivalents as defined in the appended claim.

What is claimed is:

1. A method for treating the exhaust gases of a rotary cement kiln using hazardous waste as a component of the fuel, said exhaust gases comprising solid, solidifiable and condensable particulate matter and residual hazardous organic compounds and emanating from said rotary cement kiln at a first temperature, comprising the steps of:
   a. introducing a portion of said exhaust gases to a bypass means coupled to said rotary cement kiln, said bypass means having an increased volume for carrying out the combustion of step b:
   b. maintaining said portion of said exhaust gases within said bypass means at a temperature of at least 900° C. for a selected time of between 0.01 seconds and 5.0 seconds which is sufficient to combust a desired fraction of said hazardous compounds: and then
   c. cooling said portion of said exhaust gases within said bypass means to a temperature lower than said first temperature to solidify or condense said condensable particulate matter in a period of time sufficient to prevent said particulate matter from solidifying or condensing on and adhering to said bypass means.

2. The method as claimed in claim 1, further comprising introducing nucleation particles to said portion of said exhaust gases.

3. The method as claimed in claim 2, further comprising the step of creating turbulence in said portion of said exhaust gases while subjecting said portion of said exhaust gases to a heating step.

4. The method as claimed in claim 3, wherein said cooling step comprises the step of heat exchange between said portion of said exhaust gases and a coolant selected from the group consisting of ambient air, kiln dust, and an evaporable liquid.

5. The method as claimed in claim 4, wherein said portion of said exhaust gases are heated to a temperature of between 900° C. and 1600° C.

6. The method as claimed in claim 5, wherein said portion of said exhaust gases are heated to a temperature of between 950° C. and 1250° C.

7. The method as claimed in claim 6, wherein said portion of said exhaust gases are maintained within said bypass means for between 0.1 seconds and 2.5 seconds.

8. A method for operating a rotary cement kiln using hazardous waste as a component of the fuel in an environmentally sound manner, comprising the steps of:
   a. feeding said hazardous waste fuel to said rotary cement kiln;
   b. regulating combustion gases produced during the operation of said rotary cement kiln and emanating from the feed end of said rotary cement kiln, said combustion gases comprising hazardous organic compounds, solid, solidifiable and condensable particulate matter and emanating from said rotary cement kiln at a first temperature:
   c. introducing a portion of said exhaust gases to a bypass means coupled to said rotary cement kiln, said bypass means having an increased volume sufficient to carry out the combustion of step d:
   d. maintaining said portion of said exhaust gases within said bypass means temperature of at least 900° C. for a selected time of between 0.01 seconds and 5.0 seconds which is sufficient to combust a desired fraction of said hazardous compounds: and then
   e. cooling said portion of said exhaust gases within said bypass means to a temperature lower than said first temperature to solidify or condense said condensable particulate matter in a period of time sufficient to prevent said solidifiable and condensable particulate matter from solidifying or condensing on and adhering to said bypass means.

9. The method as claimed in claim 8, further comprising introducing nucleation particles to said heated portion of said exhaust gases.

10. The method as claimed in claim 9, further comprising the step of creating turbulence in said portion of said exhaust gases.

11. The method as claimed in claim 10, wherein said cooling step comprises the step of heat exchange between said portion of said exhaust gases and a coolant selected from the group consisting of ambient air, kiln dust, and an evaporable liquid.

12. The method as claimed in claim 11, wherein said portion of said exhaust gases are heated to a temperature of between 900° C. and 1600° C.

13. The method as claimed in claim 12, wherein said portion of said exhaust gases are heated to a temperature of between 950° C. and 1250° C.

14. The method as claimed in claim 13, wherein said portion of said exhaust gases are maintained within said bypass means for between 0.1 seconds and 2.5 seconds.

15. An apparatus for treating the exhaust gases of a rotary cement kiln using hazardous waste as a component of the fuel, said exhaust gases comprising solidifiable and condensable particulate matter and residual hazardous organic compounds and emanating from said rotary cement kiln at a first temperature, comprising:
   a. bypass means having an increased volume sufficient to maintain a portion of said exhaust gases within said bypass means at a temperature equal to or higher than said first temperature for a selected increased residence time of between 0.01 seconds and 5.0 seconds which is sufficient to combust a desired portion of said residual hazardous organic compounds harmless; and
   b. means for cooling said portion of said exhaust gases within said bypass means to a temperature lower than said first temperature to solidify or condense said condensable particulate matter in a period of time sufficient to prevent said solidifiable and condensable particulate matter from solidifying or condensing on and adhering to said bypass means.

16. The apparatus as claimed in claim 15, wherein said means for solidifying and condensing said solidifiable and condensable particulate matter comprises means for introducing nucleation particles to said portion of said exhaust gases.

17. The apparatus as claimed in claim 16, further comprising means for creating turbulence in said portion of said exhaust gases and for subjecting said portion of said exhaust gases to a heating step.

18. The apparatus as claimed in claim 17, wherein said means for cooling comprises a heat exchanger using said exhaust gases as one medium and a coolant selected from the group consisting of ambient air, kiln dust, and an evaporable liquid as the cooling medium.

19. A rotary cement kiln using hazardous waste as a component of the fuel in an environmentally sound manner comprising:
   a. means for including said hazardous waste the to said rotary cement kiln:
   b. means for regulating combustion gases produced during the operation of said rotary cement kiln and emanating from the feed end of said rotary cement kiln said combustion gases comprising residual hazardous organic compounds and solidifiable and condensable particulate matter and emanating from said rotary cement kiln at a first temperature;
   c. bypass means having an increased volume sufficient to maintain a portion of said exhaust gases within said bypass means at a temperature equal to or higher than said first temperature for a selected increased residence time of between 0.01 seconds and 5.0 seconds which is sufficient to combust a desired portion of said residual hazardous organic compounds harmless; and
   d. means for cooling said portion of said exhaust gases within said bypass means to a temperature lower than said first temperature to solidify or condense said condensable particulate matter in a period of time sufficient to prevent said solidifiable and condensable particulate matter from solidifying or condensing on and adhering to said bypass means.

20. The method for treating the exhaust gases of a rotary cement kiln using hazardous waste as a component of the fuel, said exhaust gases comprising solid, solidifiable and condensable particulate matter and residual hazardous organic compounds and emanating from said rotary cement kiln at a first temperature as claimed in claim 1, further comprising the step of heating said portion of said exhaust gases within said bypass means to a second temperature higher than said first temperature prior to cooling said portion of said exhaust gases and solidifying or condensing said condensable particulate matter.

21. The method for operating a rotary cement kiln using hazardous waste as a component of the fuel in a environmentally sound manner as claimed in claim 8, further comprising the step of heating said portion of said exhaust gases within said bypass means to a second temperature higher than said first temperature prior to cooling said heated portion of said exhaust gases and bringing about solidification or condensation of said solidifiable and condensable particulate matter.

22. The apparatus for treating the exhaust gases of a rotary cement kiln using hazardous waste as a component of the fuel, said exhaust gases comprising solidifiable and condensable particulate matter and residual hazardous organic compounds and emanating from said rotary cement kiln at a first temperature as claimed in claim 15, further comprising means for heating said portion of said exhaust gases within said bypass means to a second temperature higher than said first temperature.

23. The rotary cement kiln using hazardous waste as a component of the fuel in an environmentally sound manner as claimed in claim 19, further comprising means for heating said portion of said exhaust gases within said bypass means to a second temperature higher than said first temperature.

* * * * *